United States Patent [19]

Goettsche

[11] 4,394,656

[45] Jul. 19, 1983

[54] SOUND DISPLAY APPARATUS HAVING SEPARATION CONTROL

[76] Inventor: Mark T. Goettsche, 2310 McMillan, Eugene, Oreg. 97405

[21] Appl. No.: 305,293

[22] Filed: Sep. 24, 1981

[51] Int. Cl.[3] ........................ A63J 17/00; H04Q 19/02

[52] U.S. Cl. ................................ 340/825.73; 84/464 R

[58] Field of Search ....................... 340/825.73, 825.74; 362/811; 84/464; 328/147; 455/226

[56] References Cited

U.S. PATENT DOCUMENTS 4,034,299 7/1977 Cho et al. ............................ 455/226
4,185,242 1/1980 Schaible .............................. 455/226
4,256,009 3/1981 Verduin .............................. 362/811
4,268,863 5/1981 Los .................................... 328/147

*Primary Examiner*—Donald J. Yusko
*Attorney, Agent, or Firm*—W. Thad Adams, III

[57] ABSTRACT

Apparatus for displaying the frequency spectrum of an audio signal. Multiple filters (20, 24, 25) are employed to divide an audio signal into signals each having a distinct frequency spectrum. The individual signals are combined to provide a composite reference signal. Individual comparators (26, 27, 28) compare each signal with the reference signal and individual light circuits are turned on and off in response thereto. A separation control (32) is provided to alter the magnitude of the reference voltage whereby a variation in separation between lights is achieved.

12 Claims, 2 Drawing Figures

SOUND DISPLAY APPARATUS HAVING SEPARATION CONTROL

TECHNICAL FIELD AND BACKGROUND OF THE INVENTION

The present invention relates to a modulated real time sound display apparatus. Specifically, a multi-channel sound display apparatus is provided which permits display of an audio signal spectrum in discreet frequency bands.

Sound display apparatus are known in the art which will visually display the frequency components contained within an audio signal. One such device is shown in U.S. Pat. No. 3,163,077 wherein a single input signal is divided to provide three signals having a different frequency spectrum. Such devices are known to provide a pleasant lighting effect which varies in response to the audio signal. Thus, in addition to listening to the audio signal, a visual impression is given which varies in accordance with the listened-to sound. It is desirable in light display apparatus to provide separation control whereby the individual lights activated in response to individual portions of the audio signal spectrum have a variable and selectable degree of separation between individual lights. For instance, a plurality of lights, each being responsive to a different frequency spectrum, can be controlled such that the lights appear to be distinctly operated independent from each other.

By using a preamplifier electrically disconnected from the remainder of the circuit and an amplifier for conveying an isolated audio signal to circuitry connected directly to the main power line an instantaneous sound level is obtained which is completely rectified and averaged.

SUMMARY OF THE INVENTION

It is an object of this invention to provide a light display which is modulated in response to an audio signal.

It is a more specific object of this invention to provide for a light display which independently controls separate light circuits in response to different portions of the frequency spectrum of an audio signal.

These and other objects are provided by apparatus in accordance with the present invention.

An audio signal representing audible information is divided into a plurality of frequency limited signals, each of the plurality of signals representing a different portion of the frequency spectrum of the input audio signal. A portion of each of the plurality of signals is combined to form a reference signal. The reference signal is indicative of the average energy content of the audio signal over the entire frequency spectrum.

Comparator means are provided for individually comparing each of the plurality of signals with the reference signal. The comparator means provides an output signal indicating the magnitude of the reference signal with respect to each of the signals contained in the plurality of signals. The Comparator means output signals are used to individually control each of a plurality of light circuits. Thus, each light circuit operates in response to the quantity of energy contained in one of the portions of the frequency spectrum of the audio signal.

In a preferred embodiment of the invention, means are provided for supplying a varying signal to the reference signal whereby the reference signal cyclically varies above and below a level indicating the average energy content of the audio signal.

DESCRIPTION OF THE PREFERRED EMBODIMENT

Figure 1:
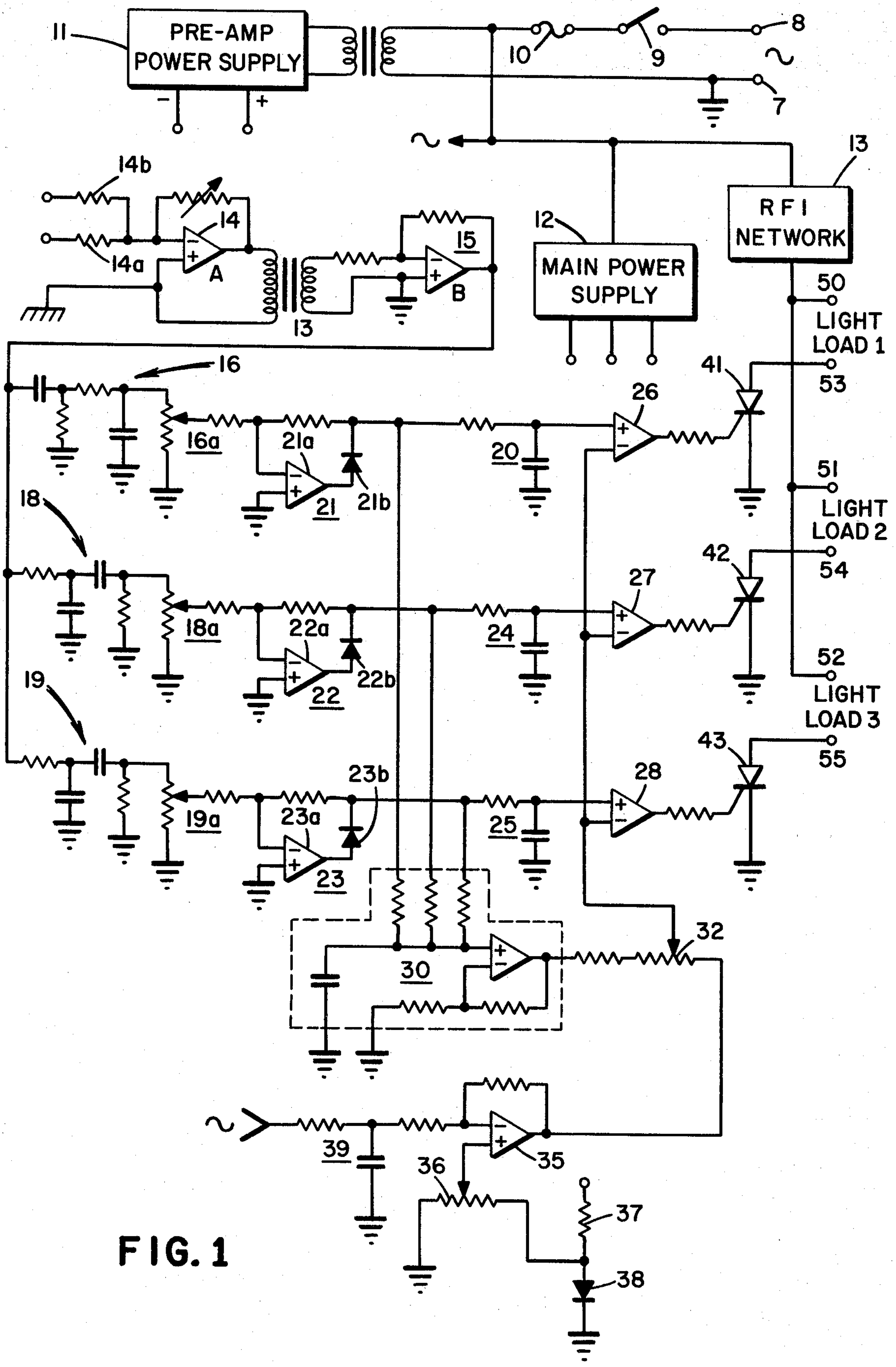
FIG. 1 is a schematic representation of an audio signal display apparatus in accordance with the present invention.

FIG. 1 illustrates a preferred embodiment of the present invention. The display apparatus of FIG. 1 is supplied with an operating voltage from an AC power line 7, 8. Switch and fuse 10 supply the necessary current through an isolation transformer in a known manner to a preamplifier power supply 11. A separate power supply 12 provides operating voltage for the remaining operational amplifier and comparators used in the apparatus of FIG. 1. Also connected to the AC power line is a radio frequency interference (RFI) network 13 and terminals 50, 51, 52. Terminals 50, 51, 52 provide voltage to one side of individual lighting circuits. Each lighting circuit includes a light source such as an incandescent light bulb. A low wattage bulb provides a fast response time as opposed to a high wattage bulb, which tends to lag behind the input. The return side of the individual lighting circuits 53, 54, 55 is connected to the anode of silicon controlled rectifiers, (SCR) 41, 42, 43. The RFI network 13 suppresses in a known manner any switching transients which may occur upon conduction of individual SCR elements.

Shown in FIG. 1 are summing resistors **14*a* and 14*b* which receive first and second stereophonically related signals. These signals can be the first and second channels of a standard stereophonic amplifier or preamplifier. The signals, when combined, are amplified by amplifier circuit 14. Amplifier circuit 14 having an adjustable gain is coupled through transformer 13 to amplifier 15. Amplifier 15 has an output terminal which supplies a composite audio signal to three bandpass filter circuits, 16, 18 and 19. The bandpass filter circuits 16 through 19 are provided in a known way by combining in tandem low pass and high pass filters. In a preferred embodiment of the invention, the first filter 16 has a passband lying principally between 90 and 400 cycles. Bandpass filter 18 provides a signal having frequency components between 400 and 2,000 cycles. Bandpass filter 19** has a filter characteristic permitting the passage of signal components having a frequency between 2,000 and 10,000 cycles. The foregoing is only one example of how to divide the frequency spectrum. Those skilled in the art will recognize other groups of frequencies which may be utilized, and additional filters may be used to derive signals for operating additional light circuits, as desired.

Each bandpass filter is terminated with a potentiometer **16*a*, 18*a*, or 19*a***. The potentiometers serve as channel intensity control devices, the devices selecting the brightness level of an individual lighting circuit for a given energy level of the signal provided by the respective filter.

The signals from the potentiometers **16*a*, 18*a*, and 19*a* are applied to a rectifier circuit. The rectifier circuits 21, 22, and 23 comprise an amplifier 21*a*, 22*a*, and 23*a*** connected to a diode 21*b*, 22*b* or 23*b*. The amplifiers provide for a minimum loading on the filter circuits, and the rectifiers, as is well known, provide a single polarity voltage.

The individual rectified signal voltages are applied to post-rectifying filter circuits 20, 24, and 25. These filter circuits reduce variation of the derived rectified voltage.

Three comparators, 26, 27, and 28 are shown which receive as one input the individual rectified signal voltages. Additionally, the individual comparator circuits 26, 27, and 28 receive a common reference voltage. A common comparator input voltage is derived from a potentiometer 32 which serves as a separation control. Potentiometer 32 receives as one input a timed alternating current signal shifted 90° from the voltage applied to terminals 50, 52. The 90° phase shifted current is provided by phase shift network 39 connected to amplifier 35. Amplifier 35 has a DC offset associated with it which is selectable by varying potentiometer 36. Potentiometer 36 receives bias voltage from the bias network comprising resistor 37 and diode 38 connected between a source of DC voltage in a known manner.

The second input to potentiometer 32 is a DC voltage level representing the average energy content in the audio signal. This relatively constant average sound level voltage is derived from summing amplifier 30. Summing amplifier 30 combines the three signals from the individual rectifier circuits 21, 22, and 23 in a known manner.

Each individual comparator 26, 27, and 28 drives the control gate of one of SCR 41, 42, or 43. When an individual comparator senses the imput voltage to exceed the average sound level voltage, the comparator switches in a known manner thereby activating the respectively connected SCR 41, 42 or 43. The SCR thereby causes current to flow through the light load.

As the sound level increases or decreases, the triggering point for the comparator increases or decreases as well. The changing trigger point for the comparator also alters the ON time for a given SCR. Changes in the ON time for each SCR will provide for softer or more brilliant lighting of an associated light circuit.

Placing the separation potentiometer 32 in one extreme position will provide for a maximum independent operation between lighting circuits. In this condition, the individual lights display only their relative differences. With separation potentiometer 32 operated in the opposite position, little relative separation is visible. The lights have an intensity proportionate to the magnitude of energy contained in filters 20, 24, 25 supplying the signal to the respective comparators 26, 27, 28. Thus, in this condition, the lights will display the approximate values of energy contained in each filter circuit, and in the opposite condition as selected by separation potentiometer 32, will light only when the energy in a particular associated filter exceeds the total average energy of the three filters 20, 24, 25.

Potentiometer 36 provides a DC level for separation potentiometer 32. The potentiometer 36 provides a level adjustment for varying the light level of each channel to a common setting between completely turned off and half-power, corresponding to the time the SCR's are fully conducting for a full half cycle.

Figure 2:
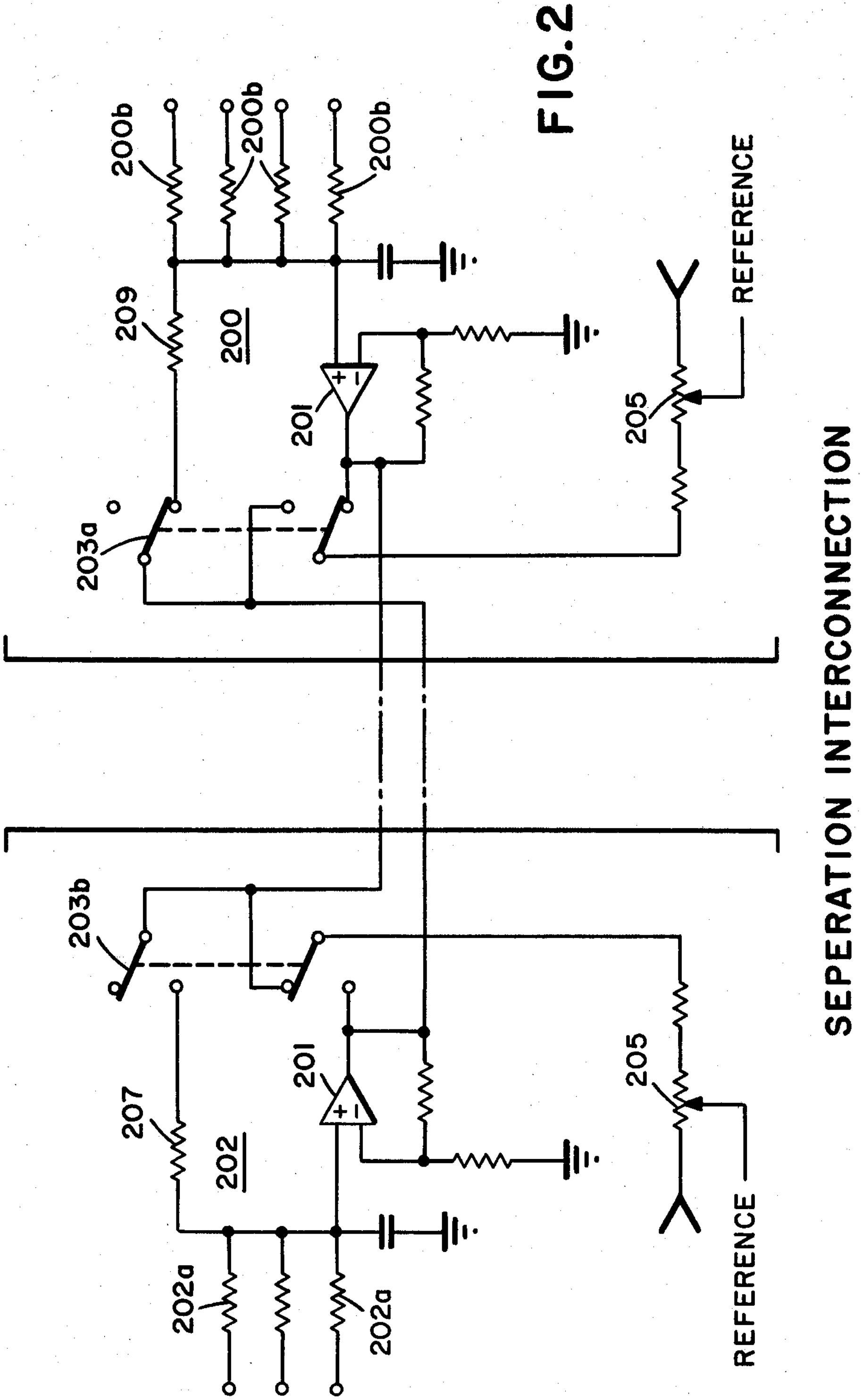
FIG. 2 is a schematic diagram illustrating the interconnection between reference levels of a plurality of audio display apparatus.

The apparatus of FIG. 1 may be used with other display apparatus. An interconection between the two display apparatus will provide for a united functioning of the separation control. Referring now to FIG. 2, there is shown two alternative techniques for providing coordinated separation control between display units. The circuits 201 shown in FIG. 2 are the respective signal generating units of two display units. In the circuit shown in FIG. 2, a four channel display unit 200, which uses 4 filters controlling SCR's is operated in connection with a three channel display unit 203 of FIG. 1. The alternate positions of each switch 203 provide for one of two different ways for interconnecting the average sound level voltage between two display units. One switch position represents the average sound level voltage provided by the 4 channel averager 200 and the three channel averager. Each summing resistor 202*a* and 200*b* are selected to have an equivalent value. Resistors 207 and 209 are selected to weight the 3 channel and 4 channel average respectively to provide a composite average of the 7 channels. In the other positions, each separation control uses the average sound level signal of the other device.

Thus, there has been described an apparatus which will display the spectrum of an audio signal by energizing different light circuits at different levels. Those skilled in the art will recognize other embodiments of the invention described more particularly by the claims which follow.

I claim:

1. A light modulated sound display for producing lighting effects from first and second stereophonically related audio signals comprising:
   (a) summation amplifier for combining said stereophonically related signals;
   (b) first, second, and third filters for receiving an output signal from said summation amplifier, said filters dividing said signal into first, second and third signals, each containing a portion of the signal frequencies contained in said output signal;
   (c) first, second and third comparators, each having an input connected to one of said first, second and third filters, and each having a reference input;
   (d) means for combining a portion of the signal provided by said filters, said means providing a reference signal for each of said comparator's reference input; and
   (e) first, second and third switching gates connected to drive individual lighting elements, said gates having a control input connected to one of said comparator output terminals, whereby said switching elements are individually controlled to illuminate a lighting element according to the signal energy provided by one of said filters.

2. The display of claim 1 further comprising means for varying the amplitude of said reference signal whereby the separation between the illumination of individual lighting elements is controlled.

3. The display of claim 1 further comprising means for combining a timed alternating signal with said reference signal whereby said comparators reference inputs are provided with a composite reference signal.

4. An apparatus for visually displaying the frequency spectrum of an audio signal comprising:
   (a) first, second and third filters having different bandpass responses, said filters being connected to receive said audio signal, said filters dividing said audio signal into first, second and third signals having distinct frequency spectrums;
   (b) means for converting said first, second and third signals into first, second and third DC voltages;

(c) means for combining said DC voltages to provide a reference voltage;

(d) first, second and third comparators connected to receive said first, second and third DC voltages, respectively, said comparators having a reference input connected to receive said reference voltage;

(e) first, second and third light control elements for switching individual light circuits, each of said elements being individually switched in response to a control signal, said light control elements having a control electrode connected to said first, second and third comparators whereby each lighting circuit is illuminated in accordance with the relative energy provided by one of said filters.

5. The apparatus of claim 4, wherein said control elements switch an alternating current for illuminating said light circuits.

6. The apparatus of claim 5, further comprising means for combining said reference signal with an alternating voltage having the same frequency as said light circuits alternating current.

7. The apparatus of claim 6, wherein said alternating voltage has a substantially 90° phase shift with respect to said alternating current.

8. An apparatus for displaying the frequency spectrum of an audio signal comprising:

(a) means for dividing said audio signal into a plurality of frequency limited signals, each of said signals representing a different portion of the frequency spectrum of said audio signal;

(b) means for combining said plurality of signals to form a reference signal;

(c) comparator means for individually comparing each of said plurality of signals with said reference signal, said comparator means providing a plurality of output signals indicating the magnitude of said reference signal with respect to each of said plurality of signals, and a plurality of switching control circuits, each connected to be operated by one of the plurality of output signals, whereby said circuits individually respond to the amount of energy contained in each of said frequency limited signals.

9. The apparatus of claim 8 further comprising means for combining a varying voltage to said reference signal whereby said reference signal changes responsively thereto.

10. The apparatus of claim 8 further comprising:

(a) means for dividing a second audio signal into a second plurality of signals;

(b) means for combining said second plurality of signals to form a second reference signal; and (c) means for combining said reference signal and said second reference signal whereby a common reference signal is produced.

11. The apparatus of claim 10 wherein said reference signal and said second reference signals are combined in a weighted relationship.

12. The apparatus of claim 11 wherein said weighted relationship is proportioned to the numerical relationship between said plurality and second plurality of signals.

* * * * *